April 3, 1962 G. H. WHITE 3,028,025
EQUIPMENT FOR TRUCK BODIES
Filed April 30, 1959 3 Sheets-Sheet 1
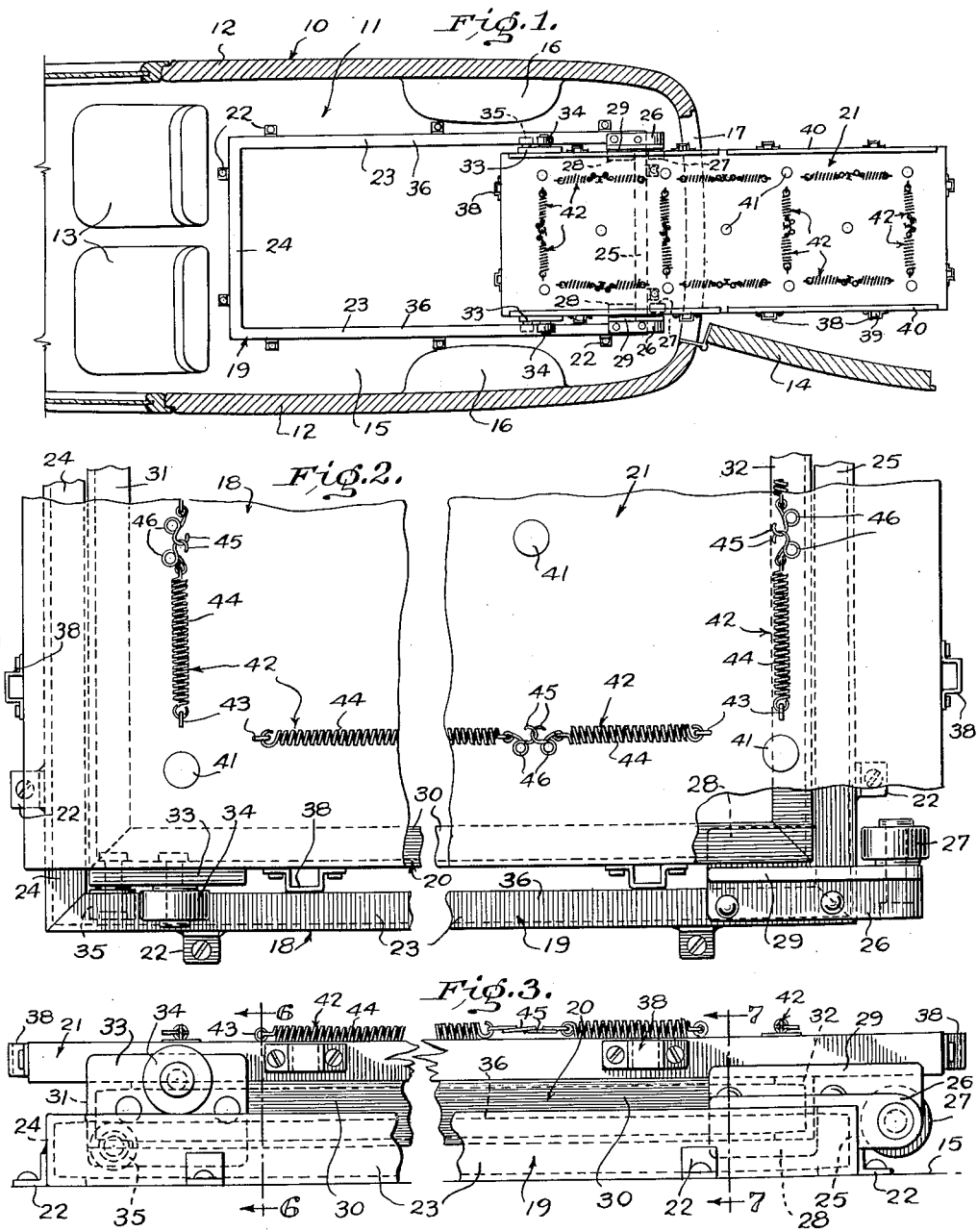
INVENTOR.
George H. White
BY
Reginald W. Hoagland
ATTORNEY April 3, 1962  G. H. WHITE  3,028,025
EQUIPMENT FOR TRUCK BODIES
Filed April 30, 1959  3 Sheets-Sheet 2
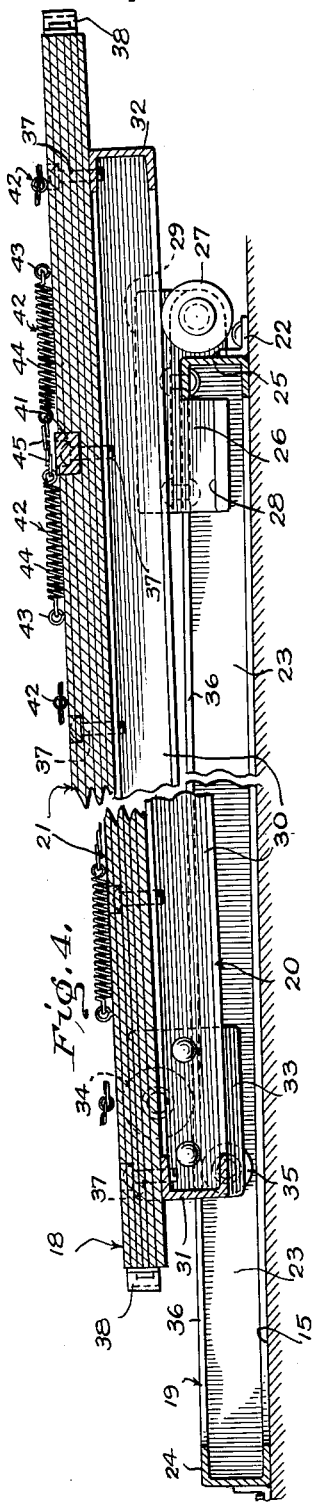
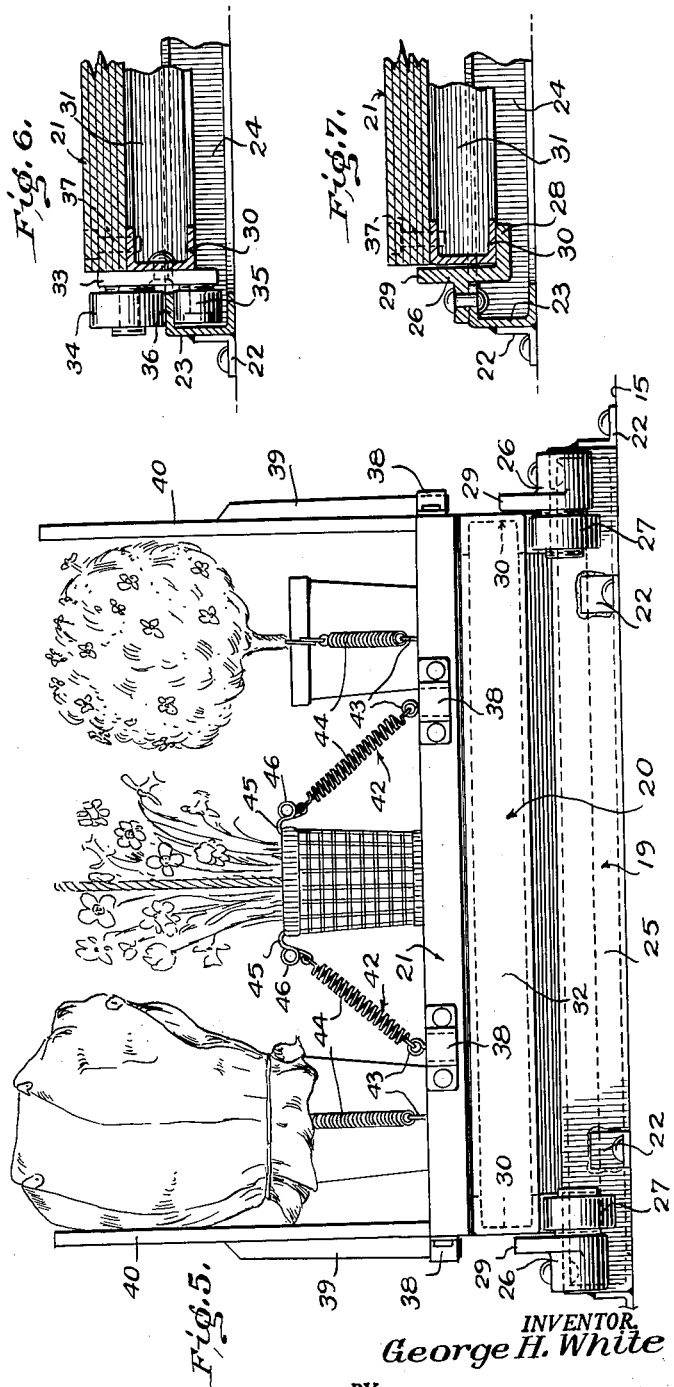
INVENTOR.
George H. White
BY Reginald W. Hoagland
ATTORNEY

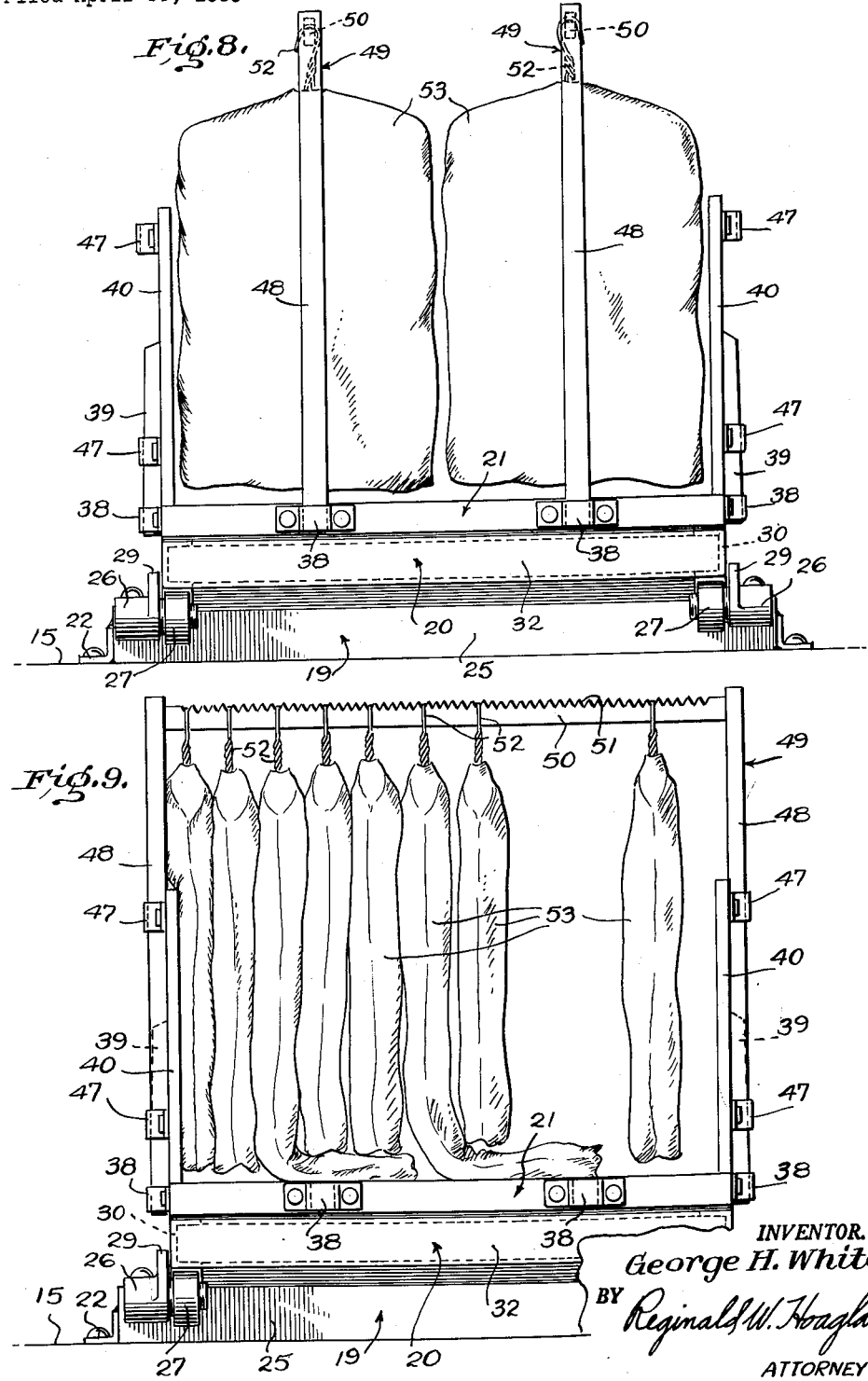

United States Patent Office 3,028,025
Patented Apr. 3, 1962

3,028,025
EQUIPMENT FOR TRUCK BODIES
George H. White, 2500 S. Saginaw St., Flint, Mich.
Filed Apr. 30, 1959, Ser. No. 809,971
9 Claims. (Cl. 214—84)

This invention relates to equipment for facilitating the loading and unloading of vehicles, and more particularly, to devices having article-supporting platforms that are movable to positions entirely within the vehicle bodies during transit and are movable to other positions extending rearwardly and outwardly of the vehicle bodies during the loading of articles on and the unloading of articles from the platforms.

The present invention is especially adapted for use in connection with lightweight panel delivery truck bodies which usually are provided with rear doors for gaining access to articles within the bodies and which normally render articles located substantially midway of the bodies practically inaccessible from either end thereof without either climbing into the parcel-carrying compartments or reaching over and disturbing other articles in said bodies. In the individual delivery of fragile articles such as flowers and plants by florists and clothing by cleaners where panel trucks are employed almost exclusively, it has been found extremely difficult to carry a full load and be able to locate and remove proper articles without disturbing and damaging other articles to be delivered elsewhere.

It therefore is an object of the present invention to provide a novel and improved article-supporting platform that is slidably mounted in the lower portion of a truck body and movable from a position from entirely within said truck body to a position with the major portion thereof extending outwardly through the rear door opening of the truck body.

Another object of the invention is to provide in a device of the character set forth a novel construction and arrangement of parts whereby the platform which is freely slidable in a horizontal direction to and from extended positions relative to the truck body is automatically held against horizontal sliding movement as well as vibratory movement upon sliding said platform to its furthermost forward position and entirely within the truck body.

A further object of the invention is to provide, in a device as outlined above, novel means for retaining articles being delivered against movement on and relative to the platform during transit.

A further object of the invention is to provide, in a device of the character set forth, removable side walls on the platform for preventing engagement of articles being carried on said platform from contact with the interior of the truck body during sliding movement of said platform.

A still further object of the invention is to provide, in a device of the character indicated, novel upstanding racks on the platform from which articles being delivered may be hung during transit.

It is also an object of the invention to provide a device of the above-indicated character, which is simple and substantial in construction, economical to manufacture, and thoroughly efficient in use.

These, together with various auxiliary features and objects of the invention which will later become apparent as the following description proceeds, are attained by the present invention, a preferred embodiment of which has been illustrated by way of example only in the accompanying drawings, wherein:

FIGURE 1 is a horizontal section taken through a panel truck body showing a plan view of the improved loading and unloading equipment applied to said body and in a position extended outwardly through the rear door opening thereof;

FIGURE 2 is a fragmentary plan view of the improved equipment with portions thereof broken away;

FIGURE 3 is a side elevation of same;

FIGURE 4 is an enlarged longitudinal section through the improved device with the central portion thereof broken away and showing the platform in a position slightly extended rearwardly;

FIGURE 5 is a rear end view of the device in the position shown in FIGURE 4 and showing side walls and articles to be delivered supported by said platform;

FIGURE 6 is a detail sectional view taken on line 6—6 of FIGURE 3;

FIGURE 7 is a similar sectional view taken on line 7—7 of FIGURE 3;

FIGURE 8 is a rear elevation of the device showing side walls and clothing racks supported by the platform; and FIGURE 9 is a similar rear elevation of the device showing a clothes rack as being supported by side walls which in turn are supported by the platform.

Referring now more specifically to the accompanying drawings wherein like numerals designate similar parts throughout the various views, attention is directed first to FIGURE 1 wherein it will be seen that there is indicated, generally by the numeral 10 the major portion of a lightweight panel truck body having a rear parcel-carrying compartment 11 within the confines of a pair of side walls 12, seats 13, and a rear door 14. The compartment 11, which in some instances is closed by a pair of doors, is shown as having the usual flat floor 15 thereof on a level below rear wheel wells 16 and the lower ledge of a rear door opening 17.

The improved equipment for facilitating the loading and unloading of the truck and forming the subject matter of this invention is generally indicated by the numeral 18, and consists mainly of a stationary frame 19 secured to the floor 15 of the truck body, a movable frame 20 slidable on said stationary frame, an article-supporting platform 21 secured to said movable frame 20, and various devices and structural arrangements for supporting and holding articles on and above said platform. The stationary frame 19, as shown in FIGURE 1, is rectangular in shape, of a size less than the floor area 15 of the truck body, and is secured to said floor by a plurality of spaced angle elements 22, each having one leg welded to a side of said frame and the other leg screwed to the floor. A pair of spaced longitudinally extending channel irons 23 having their opposite ends welded or otherwise secured to ends of forward and rearward cross channel irons 24 and 25, respectively, are used in the construction of the stationary rectangular frame 19. All channel irons are arranged with their parallel flanged portions on horizontal planes and directed inwardly of said frame.

At each of the rear corners of the stationary rectangular frame 19, there is riveted or otherwise fixed a bracket 26 which rotatably supports a roller 27 rearwardly of the rear cross channel 25 and inwardly of alignment with the spaced longitudinal channel bars 23. In addition to supporting the roller 27, each bracket 26 is constructed with a seat 28 positioned within the rectangular frame 19 and at a rear corner thereof. Also, there is provided an upstanding guide flange 29 on each bracket 26, the purpose of which, together with that of the rollers 27 and seats 28, will be set forth as the description proceeds.

The movable frame 20, which is slidably mounted on the stationary frame 19, is of a rectangular shape similar to that of the frame 19, but is of slightly less size for assuming a position partially nested within said stationary frame during transit of the vehicle. The frame 20 also has its longitudinally extending side bars 30 and its forward and rearward cross bars 31 and 32, respectively, constructed of channel irons, and has the parallel spaced flanges of said channel irons arranged horizontally and turned inwardly. At the forward corners of the frame 20 and on the outer sides of the channel-shaped side bars 30 are riveted or otherwise secured other brackets 33 in the form of vertically arranged plates which extend both above and below the bars 30, and each has rotatably mounted on the outer side thereof a pair of rollers 34 and 35. The rollers 34 roll upon the upper surfaces of the upper inturned flanges of the channel bars 23 of the stationary frame, while the rollers 35 roll on the undersides of the same flanges. Thus, it can be seen that the forward end of the movable frame 20 is held against vertical movement off of the stationary frame 19 and that the upper flanges of the channel bars 23 form tracks 36 for the rollers 34 and 35. By referring to FIGURES 3 and 4, it will be observed that the rollers 35 are not only positioned below the rollers 34, but are also positioned in advance of the rollers 34, which is for a purpose to be later set forth.

While the forward end of the movable frame 20 is at all times slidable upon the stationary frame 19, such is not the case with the rearward end of said movable frame. When the movable frame 20 is in its furthermost forward position and is nested within the frame 19 as previously stated, its rear end is in advance of and off of the rollers 27, and by its own weight is lowered and retained on the seats 28 within the corners of the stationary frame. The rear cross bar 25 of said stationary frame which is now behind the cross bar 32 of the movable frame prohibits rearward movement of said movable frame. When it is desired to slide the movable frame rearwardly, its rear end must first be manually elevated and then moved rearwardly to engage its longitudinally extending side bars or rails 30 upon the rollers 27. It is this supporting of the rear end of the movable frame in both raised and lowered positions that determines the degree of pressure applied by the rollers 34 and 35 upon the upper and lower surfaces, respectively, of the track flange 36. By positioning the lower rollers 35 in advance of the upper rollers 34, a raising of the rear end of the movable frame 20 from the seats 28 and onto the rollers 27 will relieve pressure of both rollers 34 and 35 on the track flange, while a lowering of the rear end of the movable frame from said rollers onto said seats will cause both the rollers 34 and 35 of both pairs of rollers to apply pressure on said track and thereby prevent, to a great extent, rattling caused by vibratory motion or attempted sliding movement of the movable frame relative to the stationary frame.

Either or both rollers 34 and 35 of each pair of rollers may be constructed of or have constructed thereon yieldable, resilient material which may be slightly compressed when said rollers are forced against the tracks 36 by a lowering of the rear end of the movable frame 20 upon the seats 28. Another way, not shown, but which may be found effective to accomplish the same purpose would be to yieldably mount either one or both of the rollers 34 and 35 of each pair for slight movement on and relative to the brackets 33.

It will be observed that engagement of the forward brackets 33 with the inner edges of the tracks 36 and engagement of the guide flanges 29 with the outer faces of the side bars 30 controls lateral motion of the movable frame 20 on the stationary frame 19, and that engagement of the forward cross bar 31 of the movable frame with the forward cross bar 24 of the stationary frame limits forward movement of the movable frame. Also, it is to be observed that the build-up of the stationary frame 19 and the supporting elements thereon for the movable frame 20 elevates said movable frame at a level above the lower ledge of the rear door opening 17 so that said movable frame can be passed through said rear door opening.

The platform 21, which for the purpose of illustration is shown as being constructed of a rectangular piece of plywood, extends entirely across and beyond the forward and rearward ends of the movable frame 20 and is secured to the upper flanges of the channel bars 30, 31, and 32 of said frame by bolts 37 extended through openings in the platform and threaded into other openings in said flanges, said bolts being shown in FIGURES 4, 6, and 7 and as having their heads countersunk below the upper surface of said platform. Along the four side edges of the rectangular platform 21, there are provided a plurality of loops 38 into which are received the lower ends of stakes 39 that removably support side and/or end walls 40 on said platform.

The devices previously referred to for supporting articles in upright positions on the platform consist of both permanent magnets 41 and spring-urged clamps 42. The permanent magnets are used for holding metallic articles in place and are shown as being of thick disc-shape formation and as being imbedded in the paltform with flat surfaces thereof substantially flush with the upper surface of said platform. The spring-urged clamps 42, which are especially constructed for use in holding potted plants, floral baskets, etc., in place and which may be used for many other purposes, are arranged in pairs for exerting downward pulls at opposite sides of the pots or baskets, as shown in FIGURE 5 of the drawings. Each of the clamps 42 consists of an eye 43 threaded into the platform, a coil spring 44 having one of its ends connected to said eye, and a hook on the opposite or free end of the spring. Each hook 45 is constructed with a single coiled loop 46 on its shank portion that not only serves as a finger hold for engaging and disengaging the hook on and from an article, but also serves the purpose of supplying additional spring pressure for the clamp. The clamps 42 of each pair of clamps are arranged relative to one another for applying a slight pull by their springs upon hooking their hooks together as shown in FIGURES 1 through 4. This not only prevents rattling noises of the clamps when not in use, and during transit of the vehicle, but also provides a construction for holding thereunder relatively flat articles such as wreaths, sprays, and the like against movement on the platform.

In FIGURES 8 and 9 of the drawings, the removable side walls 40 are shown as having spaced stake loops 47 on their outer sides which may be used for supporting uprights 48 of clothes racks designated generally by the numeral 49. Each rack consists of a pair of uprights 48 and a cross bar 50 connected at its opposite ends to the upper ends of said uprights. The upper surface of the cross bar is serrated, as at 51, and is adapted to have a considerable number of coat hangers 52 supporting clothing 53 to be hung thereon. With the arrangement of supporting clothing shown in FIGURE 8, the stake loops 47 on the side walls are not used, but instead, the lower ends of the uprights of a pair of clothes racks 49 are supported in the loops 38 on the front and rear ends of the platform.

In FIGURE 9, there is shown an arrangement whereby the stake loops 47 are utilized in the supporting of the uprights of a clothes rack. In this arrangement, the upper bar 50 upon which the clothes are hung extends crosswise of the platform instead of lengthwise thereof. It will be noted that some of the clothing 53, which is exceptionally long and is hung upon the bar 50, is shown as also resting on the upper surface of the platform, and that disarrangement or damage of the clothing will not occur upon sliding of the platform into and out of the truck body because the entire assembly is moved as a single unit. It will also be noted that the side walls 44 eliminate any danger of clothing contacting the edges of the door opening in the rear of the truck body during such sliding movement.

From the foregoing, it can be seen that when loading the parcel-carrying compartment 15 of the vehicle, the platform 21, which supports articles to be delivered, may be moved to a position extending outwardly through the rear door opening 17 of the vehicle and to a location where access can be more easily gained to all areas of the platform on which articles are to be retained; that during transit, the movable platform is positioned entirely within the parcel-carrying compartment and the rear door closed to protect the articles being delivered; and that when unloading articles, either individually and at different stops, or all articles at a single destination, the platform may be extended rearwardly for easily locating and removing the proper articles from their supported positions on the platform without disarranging or damaging other articles to be delivered elsewhere.

In view of the above description, taken in conjunction with the accompanying drawings, it is believed that a clear understanding of the construction, operation, and advantages of the improved invention will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. An equipment for facilitating the loading and unloading of a vehicle body having a floor and a rear opening therein, a pair of horizontal spaced flanged tracks secured to the floor of said body and extending longitudinally thereof, a movable rectangular platform within said body, a pair of rollers mounted on the forward end and at each side of said platform with one roller of each pair rolling on the upper surface of a flanged track and the other roller of the same pair rolling on the underside of a flanged track, a stationary seat arranged at the rear end portions of said flanged tracks and upon which the rear end portion of said platform is adapted to rest, and a third pair of rollers rotatably mounted rearwardly of and at a higher elevation than said seat and on which said platform is adapted to roll upon elevating the rear end portion of said platform from said seat and moving said platform rearwardly.

2. An equipment as defined in claim 1 wherein the roller of each pair of first-mentioned rollers that engage the underside of a flanged track is located below and in advance of the other roller of the same pair.

3. An equipment for facilitating the loading and unloading of a vehicle body having a floor and a rear door opening at a higher elevation than said floor, a pair of horizontal spaced flanged tracks secured to the floor of said body and extending longitudinally thereof, a movable rectangular platform within said body, a pair of rollers mounted on the forward end and at each side of said platform with one roller of each pair rolling on the upper surface of a flanged track and the other roller of each pair rolling on the underside of a flanged track, a stationary seat arranged at the rear end portions of said flanged tracks and upon which the rear end portion of said platform is adapted to rest, and a third pair of rollers rotatably mounted rearwardly of said seat and on which said platform is adapted to roll upon moving said platform rearwardly from said seat, said third pair of rollers being arranged for contacting said platform at a higher elevation than said seat and higher than the lower ledge of the rear door opening in said vehicle body.

4. An equipment as defined in claim 3 wherein the roller of each pair of first-mentioned rollers that engage the underside of a flanged track is located below and in advance of the other roller of the same pair.

5. An equipment for facilitating the loading and unloading of a vehicle body having a floor and a rear door opening therein, a pair of horizontal spaced tracks secured to the floor of said body and extending toward the door opening and longitudinally of said body, a movable rectangular platform within said body, a pair of spaced longitudinally extending rails secured to the underside of said platform and parallel with said tracks, rollers mounted on the forward ends of said rails and in rolling engagement with said tracks, and other rollers mounted on the rear ends of said tracks rearwardly of the rear ends of said rails and on which said rails are adapted to roll upon rearward movement of said platform to extend a portion thereof through the rear door opening in said body, and including at the rear ends of said tracks and in advance of said last-mentioned rollers a seat upon which the rear ends of the rails normally rest, said seat being at a lower elevation than the surfaces of the rollers upon which the rails are adapted to roll.

6. An equipment for facilitating the loading and unloading of a vehicle body having a floor and a rear door opening therein, said equipment comprising a horizontally arranged rectangular frame consisting of a pair of longitudinally extending flanged track members and forward and rearward cross members, securing means for attaching said frame stationary on the floor of said vehicle body, a second rectangular frame of substantially the same shape but of slightly lesser size than said first-mentioned frame and adapted to partially nest within said first-mentioned stationary frame, a pair of rollers mounted on the forward end of each side member of said second-mentioned frame with one roller of each pair rolling on the upper surface of a flanged track and the other roller of each pair rolling on the underside of a flanged track, a seat fixed within said first-mentioned stationary frame at the rear end portion thereof upon which the rear end portion of said second-mentioned frame rests when said second-mentioned frame is nested within said first-mentioned frame, a third pair of rollers rotatably mounted on the rear cross member of said first-mentioned stationary frame and adapted to engage the underside of the longitudinal side members of said second-mentioned frame upon unnesting and movement of said second-mentioned frame rearwardly through the door opening in said body and relative to said first-mentioned frame, and an article-supporting platform secured on said second-mentioned frame.

7. An equipment as defined in claim 6 wherein the roller of each pair of forward rollers that engage the underside of a flanged track is located below and in advance of the other roller of the same pair.

8. An equipment for facilitating the loading and unloading of a vehicle body having a rear door opening therein, said equipment comprising a horizontally arranged rectangular frame consisting of a pair of longitudinally extending flanged track members and forward and rearward cross members, securing means for attaching said frame stationary on the floor of said vehicle body, a second rectangular frame of substantially the same shape but of slightly lesser size than said first-mentioned frame and adapted to partially nest within said first-mentioned stationary frame, a pair of rollers mounted on the forward end of each side member of said second-mentioned frame with one roller of each pair rolling on the upper surface of a flanged track and the other roller of each pair rolling on the underside of a flanged track, a bracket fixed to each rear corner of said first-mentioned stationary frame, a seat on each of said brackets and within said stationary frame upon which the rear end portion of said second-mentioned frame rests when said second-mentioned frame is nested within said first-mention frame, a third pair of rollers rotatably mounted on said brackets rearwardly of the rear cross member of said first-mentioned stationary frame and adapted to engage the underside of the longitudinal side members of said second-mentioned frame upon unnesting and movement of said second-mentioned frame rearwardly through the door opening in said body and relative to said first-mentioned frame, and an article-supporting platform secured on said second-mentioned frame.

9. An equipment as defined in claim 8 wherein the roller of each pair of forward rollers that engage the underside of a flanged track is located below and in advance of the other roller of the same pair.

References Cited in the file of this patent

UNITED STATES PATENTS

| | | |
|---|---|---|
| 361,248 | Winton | Apr. 12, 1887 |
| 655,522 | Seaver et al. | Aug. 7, 1900 |
| 1,014,579 | Edgington | Jan. 9, 1912 |
| 1,269,265 | Duggan | June 11, 1918 |
| 2,094,401 | Girl | Sept. 28, 1937 |
| 2,683,553 | Ariss | July 13, 1954 |